US012650712B2

(12) United States Patent
Yan et al.

(10) Patent No.: US 12,650,712 B2
(45) Date of Patent: Jun. 9, 2026

(54) SUPPORT ASSEMBLY AND DISPLAY DEVICE

(71) Applicant: Yungu (Gu'an) Technology Co., Ltd., Langfang (CN)

(72) Inventors: Desong Yan, Langfang (CN); Fu Liao, Langfang (CN); Liwei Ding, Langfang (CN); Yuhua Wu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 364 days.

(21) Appl. No.: 18/457,572

(22) Filed: Aug. 29, 2023

(65) Prior Publication Data

US 2023/0409087 A1     Dec. 21, 2023

Related U.S. Application Data

(63) Continuation of application No. PCT/CN2022/114415, filed on Aug. 24, 2022.

(30) Foreign Application Priority Data

Dec. 2, 2021     (CN) .......................... 202123023565.6

(51) Int. Cl.
    *G06F 1/16*          (2006.01)
(52) U.S. Cl.
    CPC .......... *G06F 1/1656* (2013.01); *G06F 1/1652* (2013.01)
(58) Field of Classification Search
    CPC ........ G06F 1/1656; G06F 1/1652; G09F 9/30; G09F 9/301; H10K 59/87; H10K 77/111; H10K 2102/311
    See application file for complete search history.

(56) References Cited

U.S. PATENT DOCUMENTS

| | | | |
|---|---|---|---|
| 9,940,892 B2 * | 4/2018 | Pang | ........................ G09G 5/00 |
| 10,143,096 B2 * | 11/2018 | Park | ..................... H05K 5/0217 |

(Continued)

FOREIGN PATENT DOCUMENTS

| | | |
|---|---|---|
| CN | 109872639 A | 6/2019 |
| CN | 110185895 A | 8/2019 |

(Continued)

OTHER PUBLICATIONS

International Search Report issued on Sep. 29, 2022, in corresponding International Application No. PCT/CN2022/114415, 4 pages.

(Continued)

*Primary Examiner* — Rockshana D Chowdhury
(74) *Attorney, Agent, or Firm* — Maier & Maier, PLLC

(57)          ABSTRACT

A support assembly and a display device. The support assembly can be used to a flexible display panel. The support assembly includes: a rolling shaft, in which an axis of the rolling shaft extends in a first direction; a position-limiting portion, arranged at at least one end of the rolling shaft in the first direction, in which the position-limiting portion includes at least two position-limiting teeth, and a position-limiting space is formed between two adjacent position-limiting teeth; and a support plate, connected to the rolling shaft, in which the support plate includes a support portion for supporting the flexible display panel, the support portion includes two side edges opposite to each other in the first direction, and the support plate further includes a positioning portion protruding from at least one of the side edges of the support portion.

20 Claims, 5 Drawing Sheets

(56)                    References Cited

U.S. PATENT DOCUMENTS

| | | | | |
|---|---|---|---|---|
| 10,631,402 B2 * | 4/2020 | Xiang | G09F 9/301 | |
| 11,495,147 B2 * | 11/2022 | Qu | G09F 9/301 | |
| 11,800,657 B2 * | 10/2023 | Jiang | G06F 1/1637 | |
| 11,832,406 B2 * | 11/2023 | Kim | G06F 1/1624 | |
| 11,868,185 B2 * | 1/2024 | Wang | G09F 9/30 | |
| 11,991,844 B2 * | 5/2024 | Li | H05K 1/189 | |
| 12,124,298 B2 * | 10/2024 | Chun | G06F 1/1616 | |
| 12,144,216 B2 * | 11/2024 | Choi | H10K 77/111 | |
| 12,238,879 B2 * | 2/2025 | Choi | B32B 3/08 | |
| 12,277,010 B2 * | 4/2025 | Wang | G06F 1/1652 | |
| 2004/0183958 A1 * | 9/2004 | Akiyama | G09F 9/30 | |
| | | | 349/58 | |
| 2020/0033913 A1 * | 1/2020 | Yang | H04M 1/0268 | |
| 2020/0337159 A1 * | 10/2020 | Yang | G06F 1/1626 | |
| 2023/0225063 A1 * | 7/2023 | Wang | H05K 5/0217 | |
| | | | 361/807 | |
| 2023/0239383 A1 * | 7/2023 | Delaporte | G06F 1/1624 | |
| | | | 345/13 | |
| 2024/0028084 A1 * | 1/2024 | Feng | G09F 9/301 | |

FOREIGN PATENT DOCUMENTS

| | | | |
|---|---|---|---|
| CN | 110233918 A | 9/2019 | |
| CN | 111462630 A | 7/2020 | |
| CN | 112429604 A | 3/2021 | |
| CN | 112634753 A | 4/2021 | |
| CN | 216623630 U | 5/2022 | |
| KR | 20140101124 A | 8/2014 | |
| KR | 1020160022434 A | 3/2016 | |

OTHER PUBLICATIONS

Notice of Allowance issued on Sep. 29, 2025, in corresponding Korean Application No. 10-2023-7029364, 6 pages.

* cited by examiner

SUPPORT ASSEMBLY AND DISPLAY DEVICE

CROSS REFERENCE TO RELATED APPLICATION

The present application is a continuation of International Application No. PCT/CN2022/114415, filed on Aug. 24, 2022, which claims priority to Chinese Patent Application No. 202123023565.6, filed on Dec. 2, 2021, titled "SUPPORT ASSEMBLY AND DISPLAY DEVICE", both of which are hereby incorporated by reference in their entireties.

TECHNICAL FIELD

The present application relates to the technical field of display device, and in particular to a support assembly and a display device.

BACKGROUND

An organic light-emitting diode (OLED) may use an organic polymer material as a semiconductor material in a light-emitting diode. The polymer material can glow when an electric current is passed through it. The OLED display technology has the characteristics of self-luminescence, and also has the characteristics of wide viewing angle, high contrast and low energy consumption. Based on the characteristics of the OLED, the OLED can be fabricated on a flexible substrate, and then a thin film encapsulation layer can be fabricated on the OLED to block water and oxygen, so as to realize manufacturing a flexible display panel. The OLED flexible display panel can reduce the use of backlight, reduce a thickness of the display panel, and reduce a weight of the display device.

As the market demand for the flexible display increases, more and more attention is paid to the research and development of various flexible display devices. For example, a rollable display device has already been developed and used. The extension of the flexible display panel can be applied to increase the visibility, and a small size after rolling can increase the portability. However, the rolling poses a relatively large challenge to a current flexible display body, and it is difficult to achieve accurate positioning of the flexible display on a rolling axis.

SUMMARY

Embodiments of the present application provide a support assembly and a display device, aiming at realizing accurate positioning of a flexible display screen during a rolling process.

A first aspect of the embodiments in the present application provides a support assembly for supporting a flexible display panel. The support assembly includes a rolling shaft, in which an axis of the rolling shaft extends in a first direction; at least one position-limiting portion, arranged at at least one end of the rolling shaft in the first direction, in which the at least one position-limiting portion includes at least two position-limiting teeth, and a position-limiting space is formed between adjacent two of the at least two position-limiting teeth; and a support plate, connected to the rolling shaft, in which the support plate includes a support portion for supporting the flexible display panel, the support portion includes two side edges opposite to each other in the first direction, and the support plate further includes a positioning portion protruding from at least one of the side edges of the support portion. The support assembly has a first state and a second state; in the first state, the support plate is in a flattened state, and one end of the support plate in a second direction is connected to the rolling shaft; in the second state, the support plate curls up around the rolling shaft, and the positioning portion is confined in the position-limiting space.

A second aspect of the embodiment of the present application provides a display device including the support assembly according to any one of the embodiments in the first aspect; a flexible display panel, arranged at the support portion of the support plate, such that the flexible display panel is enabled to follow the support plate and curl up around the rolling shaft.

In the support assembly provided by the embodiments of the present application, the support assembly includes the rolling shaft, the at least one position-limiting portion arranged at at least one end of the rolling shaft and the support plate connected to the rolling shaft. The support plate is used to support the flexible display panel. The at least one position-limiting portion includes the position-limiting teeth, the position-limiting space is formed between the adjacent two of the at least two position-limiting teeth, and the positioning portion of the support plate is confined in the position-limiting space in the second state. When the support assembly is changed from the first state to the second state, in other words, when the flexible display panel is arranged on the support plate and the support plate drives the flexible display panel to curl up around the rolling shaft, the positioning portion of the curling support plate can be confined to the position-limiting space, so as to realize accurate positioning of the flexible display panel and the rolling shaft. The present application can solve the problem that the flexible display panel is prone to misalignment and the problem of loose rolling caused by the inaccurate positioning during the flexible display panel curling up around the rolling shaft.

BRIEF DESCRIPTION OF THE DRAWINGS

According to reading the detailed description of the non-limiting embodiments with reference to the following drawings, other features, objects and advantages of the present application will become more apparent. The same or similar reference numerals denote the same or similar features.

DETAILED DESCRIPTION

Figure 1:
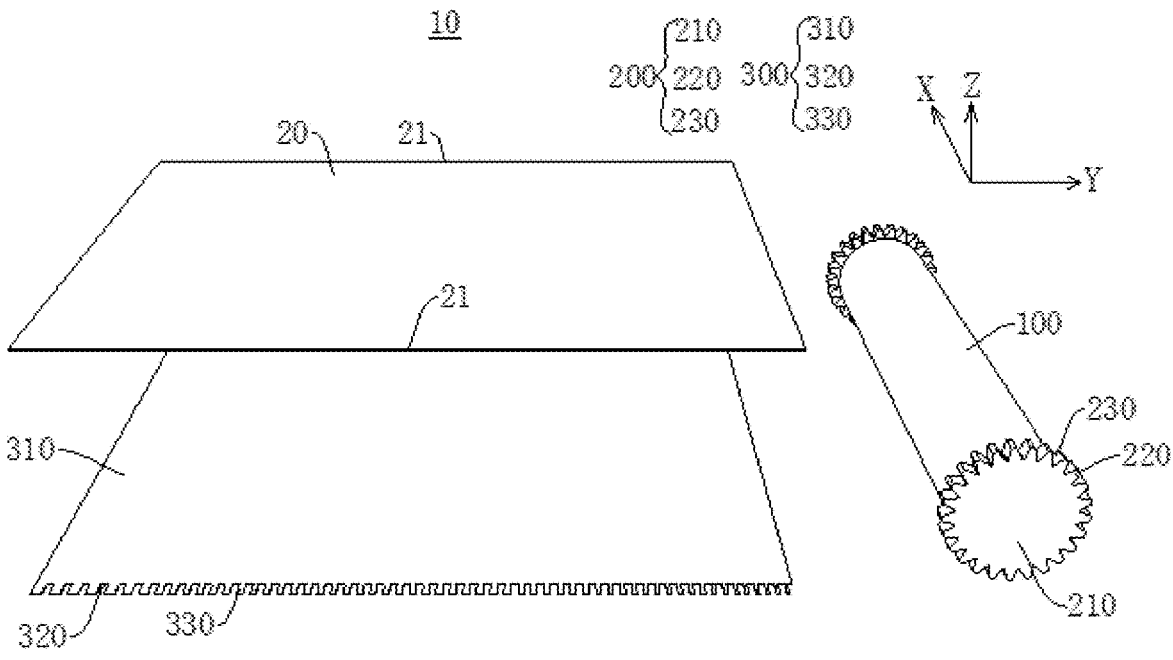
FIG. 1 shows an exploded structural schematic view of a support assembly provided by an embodiment in a first aspect of the present application.

Features and exemplary embodiments in various aspects of the present application will be described in detail below. In the following detailed description, numerous specific details are set forth in order to provide a thorough understanding of the present application. It will be apparent, however, to one skilled in the art that the present application may be practiced without some of these specific details. The following description of the embodiments is only to provide a better understanding of the present application by showing examples of the present application. In the drawings and the following description, at least some well-known structures and techniques have not been shown in order to avoid unnecessarily obscuring the present application. Moreover, the size of some structures may be exaggerated for clarity. Furthermore, the features, structures, or characteristics described hereinafter may be combined in any suitable manner in one or more embodiments.

In a rollable flexible display device provided in the related art, during the flexible display panel curling up around the rolling shaft, the problems such as loose rolling caused by the inaccurate positioning, wrinkles occurred on the rolling shaft of the flexible display panel and the like will seriously affect the service life of a display device.

In order to better understand the present application, a support assembly and a display device according to the embodiments of the present application will be described in detail below with reference to FIG. 1 to FIG. 8.

Figure 2:
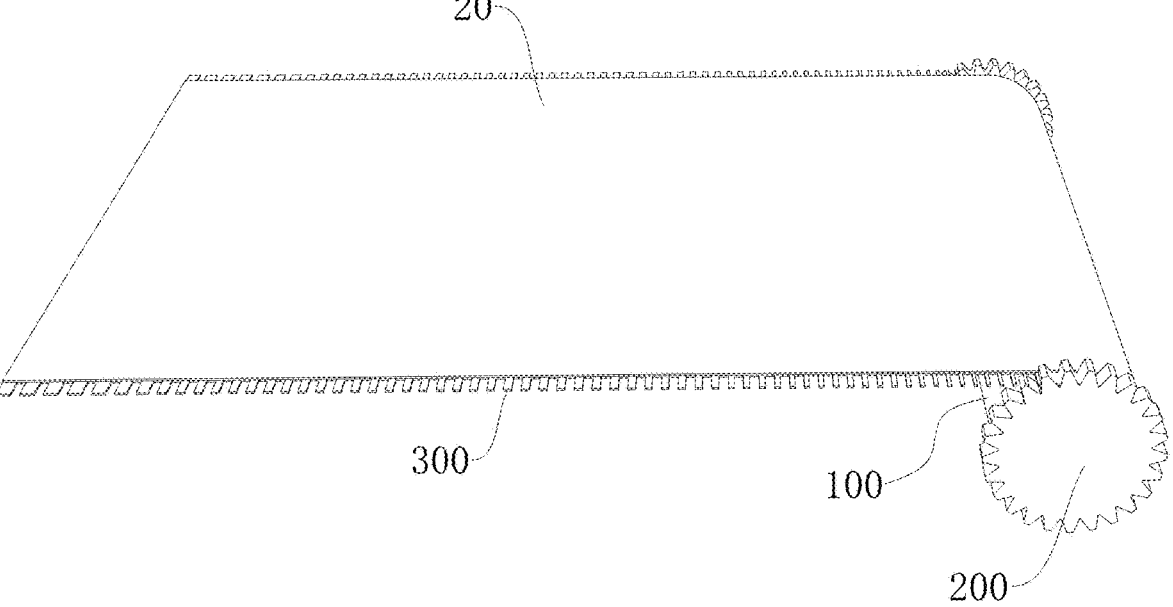
FIG. 2 shows a schematic view of a support assembly in a first state provided by an embodiment in a first aspect of the present application.
Figure 3:
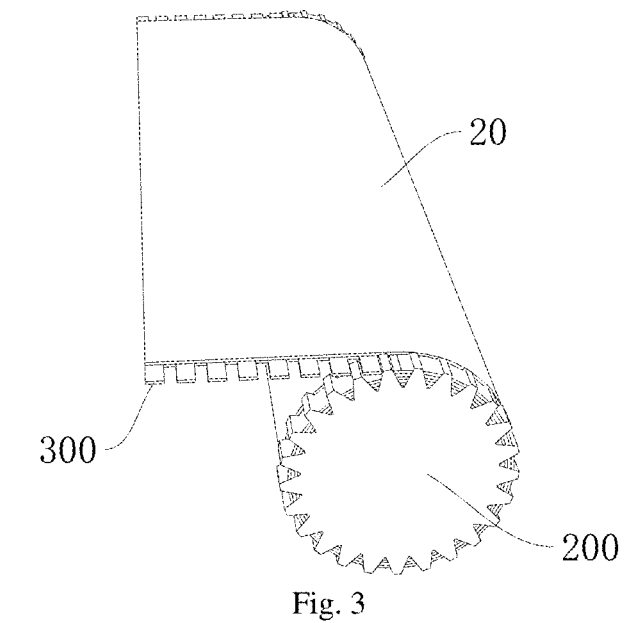
FIG. 3 shows a schematic view of a support assembly in a second state provided by an embodiment of a second aspect of the present application.

As shown in FIG. 1 to FIG. 3, a first aspect of the embodiments in the present application provides a support assembly 10 for supporting a flexible display panel 20. The support assembly 10 includes a rolling shaft 100, in which an axis of the rolling shaft 100 extends in a first direction X; at least one position-limiting portion 200, arranged at at least one end of the rolling shaft 100 in the first direction X, in which the at least one position-limiting portion 200 includes at least two position-limiting teeth 220, and a position-limiting space 230 can be formed between adjacent two of the at least two position-limiting teeth 220; and a support plate 300, connected to the rolling shaft 100, in which the support plate 300 includes a support portion 310 for supporting the flexible display panel 20, the support portion 310 may include two side edges 320 opposite to each other in the first direction X, and the support plate 300 further includes a positioning portion 330 protruding from at least one of the side edges 320 of the support portion 310. The support assembly 10 has a first state and a second state; in the first state, the support plate 300 is in a flattened state, and one end of the support plate 300 in a second direction Y is connected to the rolling shaft 100; in the second state, the support plate 300 curls up around the rolling shaft 100, and the positioning portion 330 is confined in the position-limiting space 230.

There are various ways to arrange the rolling shaft 100, for example, the rolling shaft 100 can be in a shape of a cylinder, so that it facilitates the flexible display panel 20 to curl up around the rolling shaft 100 driven by the support plate 300.

There are various ways to arrange the position-limiting portion 200. The position-limiting portion 200 can be in a shape of plate. The position-limiting portion 200 has a central axis extending in the first direction X. The position-limiting portion 200 includes a main body 210 and a plurality of position-limiting teeth 220. The plurality of position-limiting teeth 220 can be distributed at intervals on a peripheral side of the main body 210. The peripheral side of the main body 210 refers to the peripheral side of the main body 210 surrounding the central axis. Optionally, the position-limiting teeth 220 can protrude from the rolling shaft 100 in the radial direction of the rolling shaft 100, so that the positioning portion 330 of the support plate 300 can be locked between the adjacent two of the at least two position-limiting teeth 220.

Optionally, the support plate 300 can be a steel plate, so that the support plate 300 can have a good support performance and flexibility. The support plate 300 can provide support to the flexible display panel 20 and can also curl up around the rolling shaft 100. Optionally, the positioning portion 330 can be arranged to protrude from the side edges 320 in the first direction X, so that in the second state, the positioning portion 330 can be located in the position-limiting space 230 when the support plate 300 curls up around the rolling shaft 100.

In the support assembly 10 provided by the embodiments of the present application, the support assembly 10 includes the rolling shaft 100, the at least one position-limiting portion 200 arranged at at least one end of the rolling shaft 100 and the support plate 300 connected to the rolling shaft 100. The support plate 300 is used to support the flexible display panel 20. The at least one position-limiting portion 200 includes the position-limiting teeth 220, the position-limiting space 230 is formed between the adjacent two of the at least two position-limiting teeth 220, and the positioning portion 330 of the support plate 300 is confined in the position-limiting space 230 in the second state. When the support assembly 10 is changed from the first state to the second state, in other words, when the flexible display panel 20 is arranged on the support plate 300 and the support plate 300 drives the flexible display panel 20 to curl up around the rolling shaft 100, the positioning portion 330 of the curling support plate 300 can be confined to the position-limiting space 230, so as to realize accurate positioning of the flexible display panel 20 and the rolling shaft 100 and solve the problem that the flexible display panel 20 is prone to misalignment and the problem of loose rolling caused by the inaccurate positioning during the flexible display panel 20 curling up around the rolling shaft 100.

In some optional embodiments, the at least one position-limiting portion 200 includes two position-limiting portions 200. The two position-limiting portions 200 can be respectively arranged at two ends of the rolling shaft 100. The support plate 300 can be provided with the positioning portion 330 on the side edges 320 of the supporting portion 310 opposite to each other in the first direction X.

In these optional embodiments, in the second state, the positioning portions 330 arranged at the two side edges of the support portion 310 of the support plate 300 can be confined between the position-limiting teeth 220 of the two position-limit portions 200, thereby avoiding the support plate 300 from sliding and misaligning in the first direction X, and further improving the stability of the relative position between the flexible display panel 20 and the rolling shaft 100. In the second state, the positioning portions 330 located at the two side edges of the support portion 310 of the support plate 300 can be confined in the position-limiting space 230, so that it can make a force on the support plate 300 more balanced.

In some optional embodiments, the support plate 300 includes at least two positioning portions 330 protruding from at least one of the side edges 320 of the support portion 310, and the positioning portions 330 are distributed at intervals in an extending direction of the at least one of the side edges; in the second state, at least two positioning portions 330 are confined in the same position-limiting space 230.

In these optional embodiments, when at least two positioning portions 330 are confined within the same position-limiting space 230, in the second state, the support plate 300 curling around the rolling shaft 100 can be arranged in form of at least two layers. On the one hand, it can reduce a spatial size of the rolled support assembly 10, and on the other hand, it can also increase the size of the support plate 300 in the first state, and improve the display size of the flexible display panel 20 in the first state.

Optionally, the number of position-limiting teeth 220 can be three or more to form at least two position-limiting spaces 230 on the peripheral side of the main body 210. In the second state, at least two positioning portions 330 on the same layer of support plate 300 can be respectively confined in the at least two position-limiting spaces 230 formed on the peripheral side of the main body, so that it can further improve the stability of the relative position between the support plate 300 and the rolling shaft 100.

Figure 4:
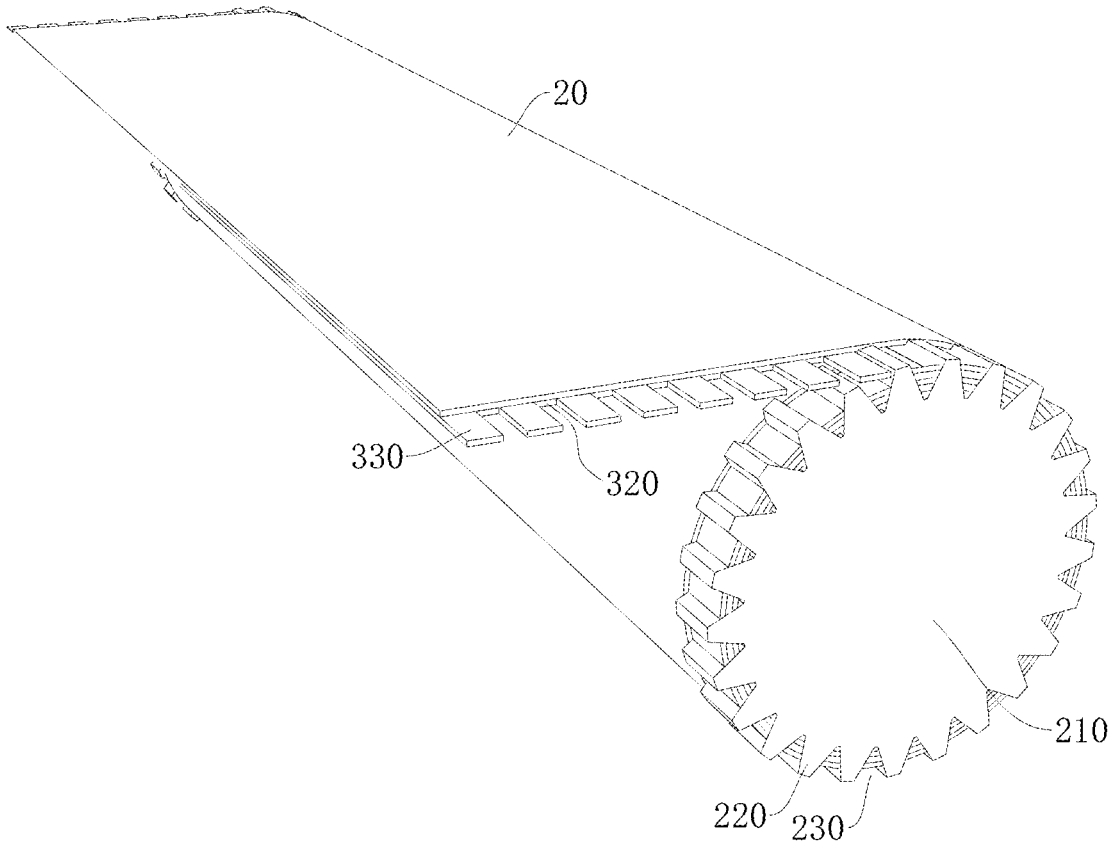
FIG. 4 shows a partial enlarged structural schematic view of FIG. 3.
Figure 5:
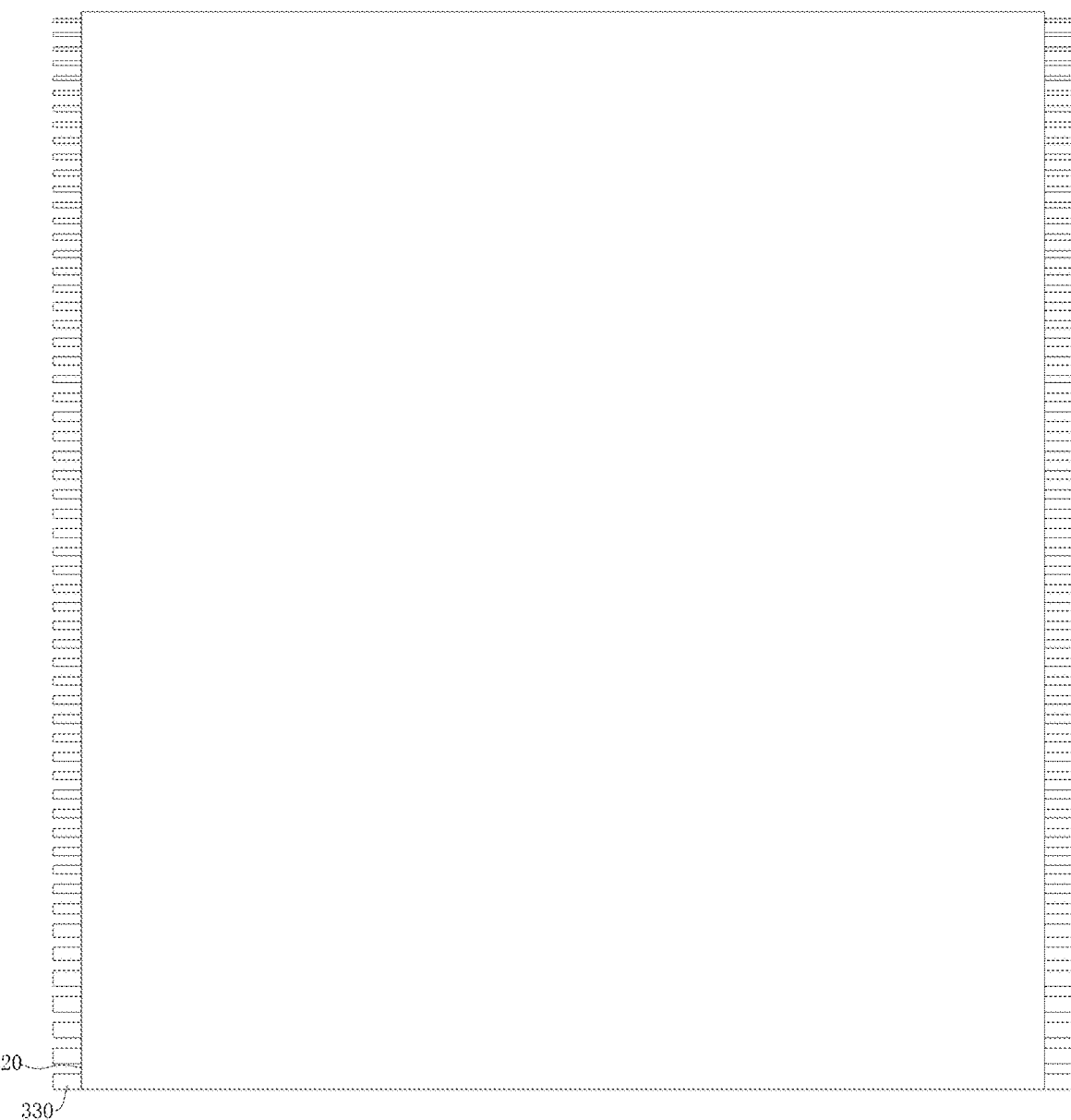
FIG. 5 shows a schematic view of a support plate of a support assembly provided by an embodiment in a first aspect of the present application.

In some optional embodiments, as shown in FIG. 4 and FIG. 5, in the first state, a first distance is disposed between centers of adjacent two of the at least two positioning portions 330 in the second direction Y, and at least two adjacent first distances gradually increase in a direction away from the rolling shaft 100.

In the second state, in a direction away from the central axis, a distance between an outer layer of the support plate 300 and the central axis may be larger than a distance between an inner layer of the support plate 300 and the central axis. Therefore, the first distance between the centers of the adjacent two of the at least two positioning portions 330 of the outer layer of the support plate 300 may be larger than the first distance between the centers of the two adjacent positioning portions 330 of the inner layer of the support plate 300, and the second distance between the edges of the two adjacent positioning portions 330 of the outer layer of the support plate 300 may be smaller than the second distance between the edges of the two adjacent positioning portions 330 of the inner layer of the support plate 300. When at least two adjacent first distances gradually increase in the direction away from the rolling shaft 100, the positioning portions 330 in different layers of the support plate 300 can be accurately located within the position-limiting space 230, so that the problem of the outer layer of the support plate 300 being pulled can be solved.

In some optional embodiments, a size of a gap between the adjacent two of the at least two position-limiting teeth 220 gradually can increase in a radial direction of the rolling shaft 100; in the second state, width sizes of the positioning portions 330 located in the same position-limiting space 230 can gradually increase in a direction away from the axis of the rolling shaft 100, so that each of the positioning portions 330 of the support plate 300 in the second state can be clamped within the position-limiting space 230. The width size of the positioning portion 330 refers to an extension size of the positioning portion 330 in the second direction Y in the first state.

In these optional embodiments, the size of the gap between the adjacent two of the at least two position-limiting teeth 220 can gradually increase, and the width size of the positioning portion 330 can gradually increase. In the second state, when at least two positioning portions 330 are arranged in layers within the position-limiting space 230, the smaller positioning portion 330 of the inner layer of the support plate can enter the position-limiting space 230 from a larger space without hindrance and be clamped in the position-limiting space 230, and the larger positioning portion 330 of the outer layer of the support plate can also be arranged to be clamped in the position-limiting space 230.

Optionally, a surface of each of the position-limiting teeth 220 facing the position-limiting space 230 is a flat face, and a distance between two surfaces of the adjacent two of the at least two position-limiting teeth 220 facing the position-limiting space 230 gradually increases in the radial direction of the rolling shaft 100.

Figure 6:
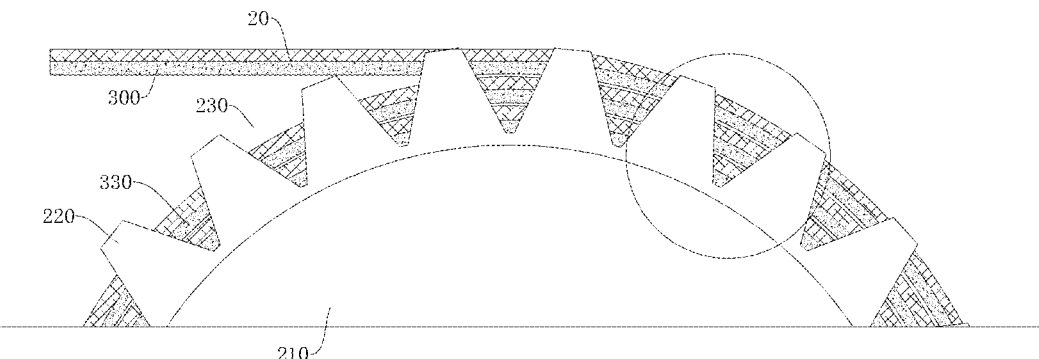
FIG. 6 shows a partial enlarged structural schematic view of FIG. 3.
Figure 7:
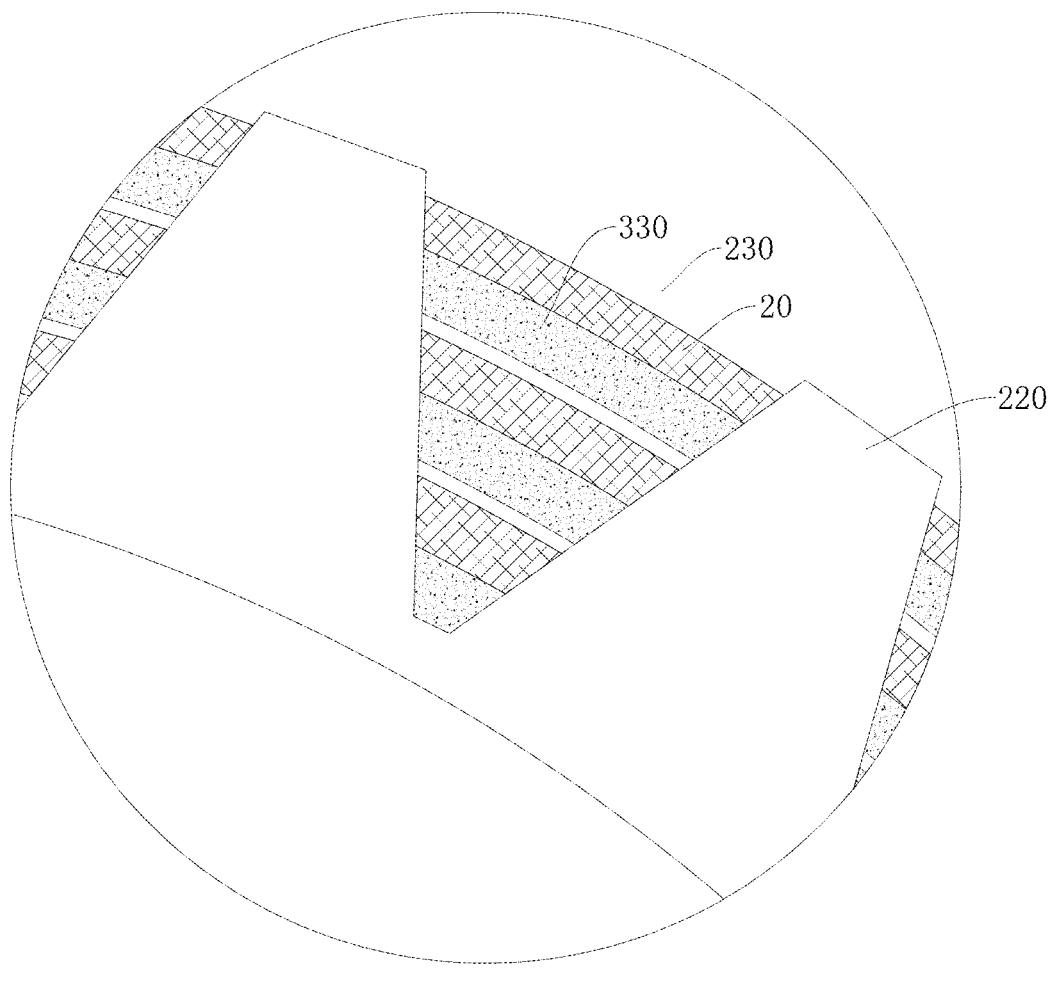
FIG. 7 shows a partial enlarged structural schematic view of FIG. 6.

In some optional embodiments, as shown in FIG. 6 and FIG. 7, in the second state, a layer gap can be formed between two adjacent positioning portions 330 located in the same position-limiting space 230, so that it can prevent the outer layer of the support plate 300 from squeezing the inner layer of the support plate 300. When the support assembly 10 is used to support the flexible display panel 20, it can prevent the outer layer of the support plate 300 from squeezing the flexible display panel 20 located on the inner layer of the support plate 300, reduce the force on the flexible display panel 20 between layers, and improve the service life of the flexible display panel 20.

Figure 8:
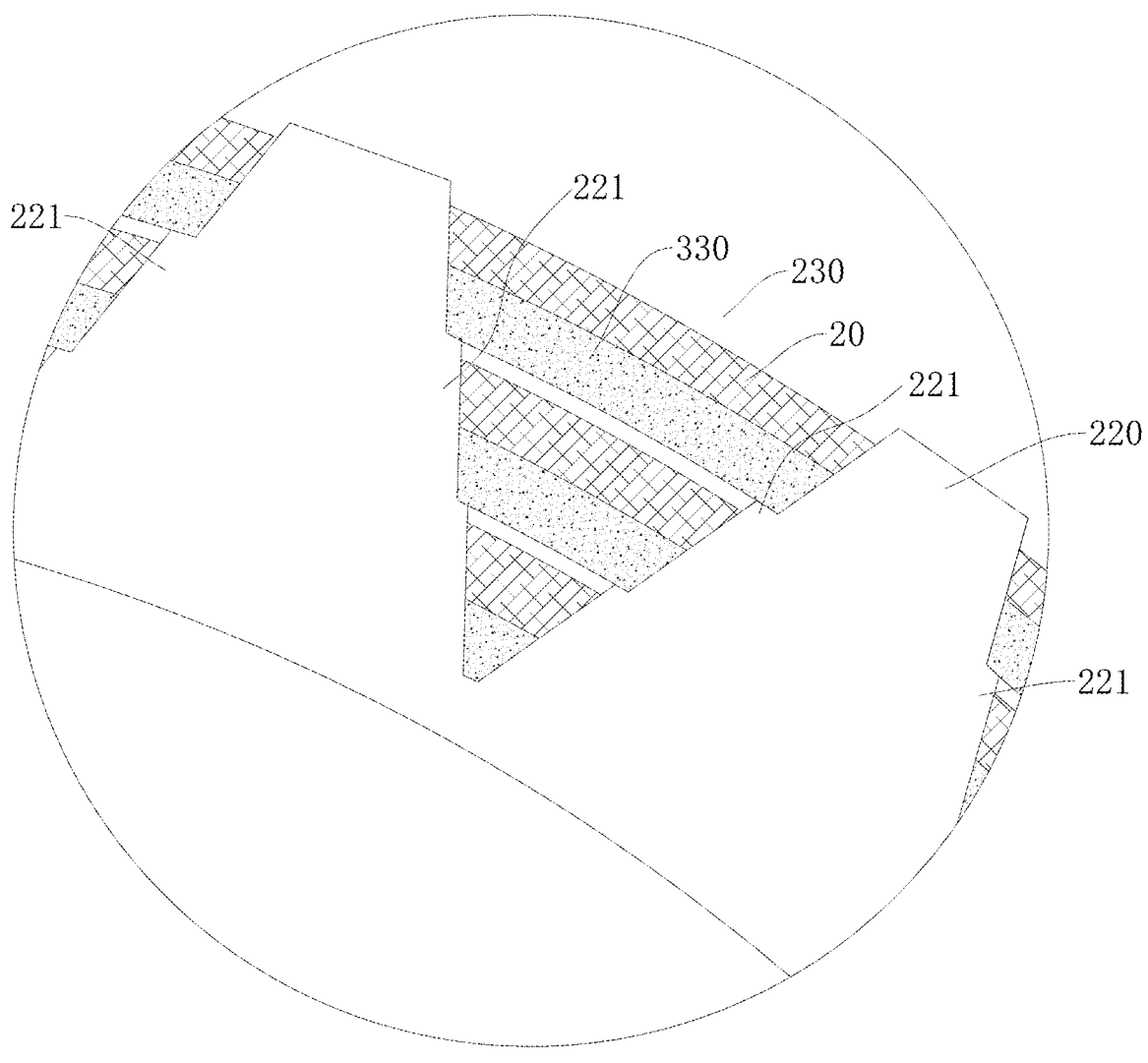
FIG. 8 shows a partial enlarged structural schematic view of FIG. 6 in another embodiment.

In other optional embodiments, as shown in FIG. 8, a position-limiting step 221 can be arranged on the surface of each of the position-limiting teeth 220 facing the position-limiting space 230, and in the second state, at least one of the positioning portions 330 located in the same position-limiting space 230 can engage with the position-limiting step 221.

In these optional embodiments, the position-limiting step 221 can be arranged. On the one hand, it can ensure the relative position between the positioning portions 330 and the position-limiting teeth 220, and on the other hand, it can also ensure the stability of the relative positions among the plurality of positioning portions 330 within the same position-limiting space 230.

Optionally, when two positioning portions 330 are arranged in the same position-limiting space 230, there can be only one pair of position-limiting steps 221. The pair of position-limiting steps 221 can be used to engage the positioning portion 330 which is farther from the center of the rolling shaft 100.

When three or more positioning portions 330 are arranged in the same position-limiting space 230, there can be at least two pairs of position-limiting steps 221 arranged in the position-limiting space 230, and the pairs of position-limiting steps 221 can be used to engage the positioning portions 330 respectively. Optionally, a height of the position-limiting step 221 can be larger than or equal to a sum of a thickness of the positioning portion 330 and a thickness of the flexible display panel 20, thereby enabling to form the layer gap as described above.

There are various ways to set a size of the layer gap in the radial direction of the rolling shaft 100. Optionally, the size of the layer gap in the radial direction of the rolling shaft 100 can be larger than or equal to the thickness of the flexible display panel 20, for example, the size of the layer gap can be larger than or equal to 0.2 mm. When the flexible display panel 20 is arranged on the support plate 300, the size of the layer gap can be larger than or equal to the thickness of the flexible display panel 20, so that the two adjacent support plates 300 will not apply a clamping force to the flexible display panel 20 located between the two adjacent support plates 300, and it can prevent the flexible display panel 20 from being crushed and damaged by the outer layer of the support plate 300. For example, in the adjacent two support plates 300, the gap between the outer layer of the support plate 300 and the flexible display panel 20 on the inner layer of the support plate 300 can be larger than or equal to 0.1 mm.

In these optional embodiments, a length of the positioning portion 330 in the first direction X may be less than or equal to a length of each of the position-limiting teeth 220 in the first direction X.

In these optional embodiments, in the first direction X, when the length of the positioning portion 330 is less than or equal to the length of each of the position-limiting teeth 220, that is, when the length of the positioning portion 330 is less than or equal to a tooth thickness of each of the position-limiting teeth 220, in the second state, the positioning portion 330 located in the position-limiting space 230 can be prevented from protruding from an end surface of each of the position-limiting teeth 220 facing away from the rolling shaft 100, thereby ensuring the flatness of the end surface of each of the position-limiting teeth 220 facing away from the rolling shaft 100.

In some optional embodiments, the at least one position-limiting portion 200 further includes a main body 210, the plurality of the position-limiting teeth can be distributed at intervals at a peripheral side of the main body 210, and a radial size of the main body 210 can be equal to a radial size of the rolling shaft 100.

In these optional embodiments, due to the radial size of the main body 210 being equal to the radial size of the rolling shaft 100, when the support plate 300 curls up around the rolling shaft 100 and the positioning portion 330 of the innermost layer of the support plate is attached to a surface of the main body 210, the inner layer of the support plate 300 arranged to be close to the rolling shaft 100 can be attached to a surface of the rolling shaft 100, thereby avoiding a gap between the innermost layer of the support plate 300 and the rolling shaft 100.

A second aspect of the embodiment of the present application provides a display device including the support assembly 10 according to any one of the embodiments in the first aspect and the flexible display panel 20. The flexible display panel 20 can be arranged at the support portion 310 of the support plate 300, such that the flexible display panel 20 can follow the support plate 300 and curl up around the rolling shaft 100.

In the display device provided in the embodiment of the present application, when the support component 10 transitions from the first state to the second state, in other words, when the flexible display panel 20 is arranged at the support plate 300, and the support plate 300 drives the flexible display panel 20 to curl up around the rolling shaft 100, the positioning portion 330 of the curling support plate 300 can be confined in the position-limiting space 230, so as to realize accurate positioning of the flexible display panel 20 and the rolling shaft 100. Therefore, it can solve the problem that the flexible display panel 20 is prone to misalignment and the problem of loose rolling caused by the inaccurate positioning during the flexible display panel 20 curling up around the rolling shaft 100.

Optionally, the flexible display panel 20 may have two edges 21 arranged opposite to each other in the first direction X. Respective edges 21 of the flexible display panel 20 can be aligned with respective side edges 320 of the support portion 310 of the support plate 300. Alternatively, respective edges 21 of the flexible display panel 20 can be arranged to align with any position of the support portion 310 between respective side edges 320 of the support portion 310 and a centerline of the support portion 310 in the first direction X, so as to prevent the side edges 320 from scratching the edges 21, thereby avoiding the edges 21 of the flexible display panel 20 from warping and avoiding wrinkles of the flexible display panel 20.

Although the present application has been described with reference to preferred embodiments, various improvements can be made and components can be replaced with equivalents without departing from the scope of the present application. Especially, as long as there is no structural conflict, the various technical features mentioned in each embodiment can be combined in any way. The present application is not limited to the specific embodiments disclosed in the text, but includes all technical solutions falling within the scope of the claims.

What is claimed is:

1. A support assembly for supporting a flexible display panel, the support assembly comprising:

a rolling shaft, wherein an axis of the rolling shaft extends in a first direction;

at least one position-limiting portion, arranged at at least one end of the rolling shaft in the first direction, wherein the at least one position-limiting portion comprises at least two position-limiting teeth, and a position-limiting space is formed between adjacent two of the at least two position-limiting teeth; and a support plate, connected to the rolling shaft, wherein the support plate comprises a support portion for supporting the flexible display panel, the support portion comprises two side edges opposite to each other in the first direction, and the support plate further comprises a positioning portion protruding from at least one of the side edges of the support portion;

wherein the support assembly comprises a first state and a second state; in the first state, the support plate is in a flattened state, and one end of the support plate in a second direction is connected to the rolling shaft; in the second state, the support plate curls up around the rolling shaft, and the positioning portion is confined in the position-limiting space.

2. The support assembly according to claim 1, wherein the support plate comprises at least two positioning portions, protruding from at least one of the side edges of the support portion and distributed at intervals in an extending direction of the at least one of the side edges; and in the second state, in a radial direction, at least two positioning portions are confined in the same position-limiting space.

3. The support assembly according to claim 2, wherein in the first state, a first distance is disposed between centers of adjacent two of the at least two positioning portions in the second direction, and at least two adjacent first distances gradually increase in a direction away from the rolling shaft.

4. The support assembly according to claim 2, wherein
a size of a gap between adjacent two of the at least two position-limiting teeth gradually increases in a radial direction of the rolling shaft;

in the second state, width sizes of the positioning portions located in the same position-limiting space gradually increase in a direction away from the axis of the rolling shaft.

5. The support assembly according to claim 4, wherein in the second state, a layer gap is formed between two adjacent positioning portions located in the same position-limiting space.

6. The support assembly according to claim 5, wherein a position-limiting step is arranged on a surface of each of the position-limiting teeth facing the position-limiting space, and in the second state, at least one of the positioning portions located in the same position-limiting space engages with the position-limiting step.

7. The support assembly according to claim 5, wherein a size of the layer gap in the radial direction of the rolling shaft is larger than or equal to a thickness of the flexible display panel.

8. The support assembly according to claim 1, wherein a length of the positioning portion in the first direction is less than or equal to a length of each of the position-limiting teeth in the first direction.

9. The support assembly according to claim 1, wherein the at least one position-limiting portion further comprises a main body, the position-limiting teeth are distributed at intervals at a peripheral side of the main body, and a radial size of the main body is equal to a radial size of the rolling shaft.

10. The support assembly according to claim 1, wherein the at least one position-limiting portion comprises two position-limiting portions, the two position-limiting portions are respectively arranged at two ends of the rolling shaft, and the positioning portion is disposed in each of the two side edges of the support portion of the support plate.

11. The support assembly according to claim 9, wherein the position-limiting portion comprises three or more position-limiting teeth to form at least two position-limiting spaces on the peripheral side of the main body.

12. The support assembly according to claim 11, wherein in the second state, at least two positioning portions of the support plate on the same layer are respectively confined in at least two position-limiting spaces formed on the peripheral side of the main body.

13. The support assembly according to claim 1, wherein the position-limiting teeth are arranged to protrude from the rolling shaft in a radial direction of the rolling shaft to receive the positioning portion of the support plate between two adjacent position-limiting teeth.

14. The support assembly according to claim 1, wherein in the second state, the support plate curls up around the rolling shaft in at least two layers.

15. The support assembly according to claim 14, wherein the position-limiting portion has a central axis extending in the first direction, and in the second state, a distance between an outer layer of the support plate and the central axis is larger than a distance between an inner layer of the support plate and the central axis in a direction away from the central axis.

16. The support assembly according to claim 15, wherein in the second state, a first distance between centers of two adjacent positioning portions of the outer layer of the support plate in a circumferential direction is larger than a first distance between centers of two adjacent positioning portions of the inner layer of the support plate in the circumferential direction, and a second distance between edges of two adjacent positioning portions of the outer layer of the support plate in the circumferential direction is smaller than a second distance between edges of two adjacent positioning portions of the inner layer of the support plate in the circumferential direction.

17. The support assembly according to claim 1, wherein the position-limiting portion is formed in a shape of plate.

18. The support assembly according to claim 1, wherein the support plate is a steel plate.

19. A display device, comprising
    the support assembly according to claim 1;
    a flexible display panel, arranged at the support portion of the support plate, such that the flexible display panel is able to follow the support plate and curls up around the rolling shaft.

20. The display device according to claim 19, wherein the flexible display panel comprises two edges opposite to each other in the first direction, and
    respective edges of the flexible display panel are arranged to align with respective side edges of the support portion, or respective edges of the flexible display panel are arranged to align with any position of the support portion between respective side edges of the support portion and a centerline of the support portion in the first direction.

* * * * *